May 10, 1960 J. M. HUNT 2,935,796
FLIGHT COMPUTER FOR GROUNDED AIRCRAFT TRAINER
Filed July 27, 1956 2 Sheets-Sheet 1

JOHN M. HUNT
INVENTOR.

BY Darby & Darby
ATTORNEYS.

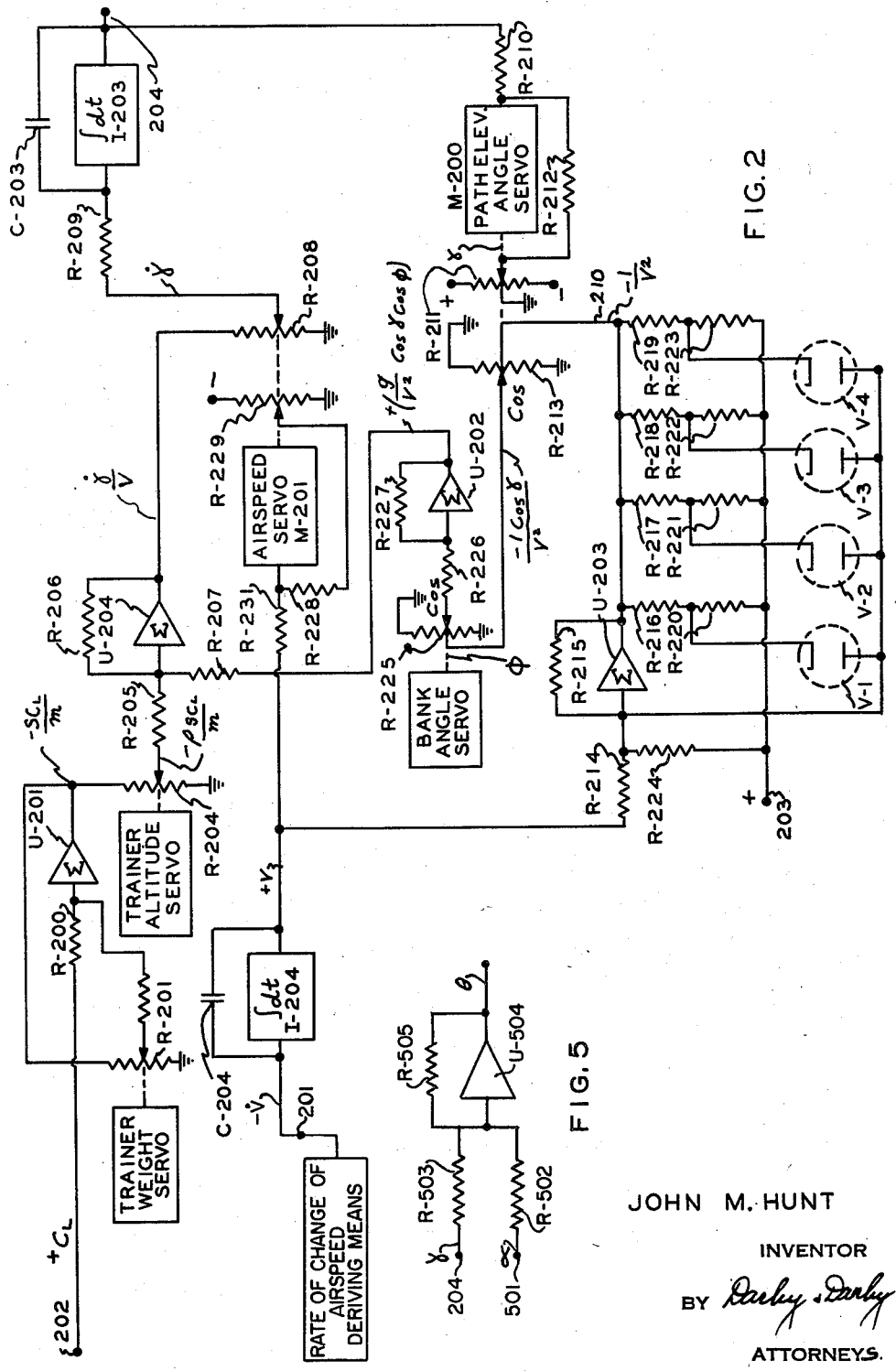

United States Patent Office 2,935,796
Patented May 10, 1960

2,935,796

FLIGHT COMPUTER FOR GROUNDED AIRCRAFT TRAINER

John M. Hunt, Binghamton, N.Y., assignor to General Precision, Inc., a corporation of Delaware Application July 27, 1956, Serial No. 600,479

5 Claims. (Cl. 35—12)

This invention relates to improvements in grounded aircraft trainers or simulators, and more particularly to the elimination of various shortcomings or undesirable effects characteristic of prior art devices of that nature. As is well known to those skilled in the art, most modern grounded trainers solve the equations of motion of an aircraft by means of analog computer equipment to provide instrument and other output indications simulating those indications of actual aircraft instruments and indicators. The training value of such trainers is known to be related closely to the degree of precision with which the computers solve the steady-state and dynamic equations of motion of the aircraft being simulated.

The physical laws governing aircraft flight are such that simulated aircraft velocity and simulated climb angle are inter-related, so that analog computer servos or other devices computing these two simulated quantities are usually interconnected. As is well known in the analog computer art, interconnected servos tend to become unstable, due to electromechanical servo anomalies such as backlash, lack of infinite resolution, friction, hysteresis, etc. In all prior art trainers of which I am aware, such servo limitations have resulted in simulators having a longitudinal instability which provides an unwanted phugoid type of oscillation in addition to the actual phugoid characteristic of the aircraft being simulated. Though such oscillation is bounded, it is often of sufficient magnitude to interfere considerably with the realism of the output indications associated with the simulator vertical system, so that the rate of climb indicator needle and the horizontal needle of many simulator gyro horizon indicators unrealistically have oscillated up and down, even when the student has properly operated the simulator controls so that no oscillation would occur on the instruments of an actual aircraft. Errors in computing instantaneous simulated flight path elevation angle and instantaneous simulated pitch angle may be seen to be less critical in nature during simulated flight conditions during which the simulated aircraft pitch attitude and rate of climb are changing; but on the other hand, it will be seen that if the simulated aircraft should maintain a fixed pitch attitude, such as is commonly attained during cruising conditions at nearly straight and level flight, unwarranted oscillatory pitch bar and climb needle indications occurring on simulator pitch attitude indicating and rate of climb instruments will be disconcerting and unrealistic to a student pilot "flying" the simulator.

It is therefore a primary object of the invention to provide an improved longitudinal system in a grounded aircraft trainer.

It is a more specific object of the invention to provide an improved longitudinal system for a grounded aircraft trainer which need not be provided with false stabilizing signals which undesirably affect its dynamic response.

It is a further object of the invention to provide an improved longitudinal system simulator which incorporates the advantages of direct-current carrier computation without requiring the use of all-electronic apparatus for multiplying two quantities which exist only as voltages.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

Fig. 2 is an electrical schematic diagram illustrating an exemplary embodiment of the invention, with only those portions of a modern flight simulator shown which are necessary for an understanding of the invention.

Fig. 5 is a diagram illustrating the manner in which a pitch angle potential is derived.

Figure 1:
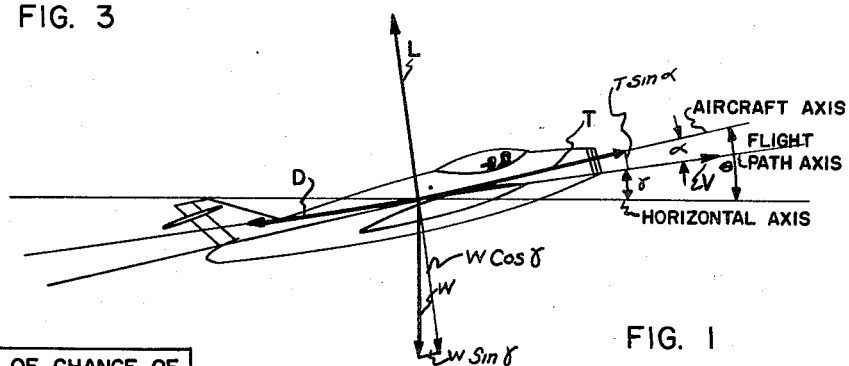
Fig. 1 is a geometrical diagram illustrating the principal forces which act on an aircraft during unbanked and unyawed flight.

Referring now to Fig. 1 there is shown a vector diagram illustrating (in the vertical plane only for the sake of clarity) the principal forces which affect longitudinal stability of an aircraft. Assume that an aircraft is traveling with an air-speed V along a flight path indicated by arrow V at a flight path elevation angle $\gamma$ with respect to the horizontal. The aircraft may have a drag force such as represented by vector D acting rearwardly along the flight path, a lift force such as represented by the vector L acting normal to the flight path, a thrust force such as that represented by the vector T acting along the aircraft axis at an angle $\alpha$ from the flight path, for example, and a weight force such as represented by vector W acting downwardly. During steady-state flight all of these forces will add up to zero, and the aircraft will continue at the same velocity along the same flight path. It is imperative for proper grounded training, however, that the dynamic as well as static response of the grounded trainer realistically simulate that of the actual aircraft, so grounded trainers commonly solve differential equations involving dynamic terms related to aircraft motion.

In many prior art flight simulators it has been usual to compute simulated flight path elevation angle $\gamma$ by integrating with respect to time a $\dot\gamma$ quantity (rate of change of path elevation angle) computed from an expression of the following type:

$$mV\dot\gamma = T\sin\alpha + L - W\cos\gamma \qquad (1)$$

Equation 1 is also shown in simplified form in that it considers forces acting solely in the vertical plane of the flight path and there is no bank angle. This equation may be seen to express a summation of forces normal to the simulated flight path. The dynamic term $mV\dot\gamma$ may be seen from ordinary principles of mechanics to express centrifugal force acting perpendicularly to the flight path. Expression 1 may be divided through by $mV$ to illustrate the quantities which have been fed as input voltages to a prior art $\gamma$ servo.

$$\dot\gamma = \frac{T\sin\alpha}{mV} + \frac{L}{mV} - \frac{W\cos\gamma}{mV} \qquad (2)$$

In order to provide suitable input potentials to a $\dot\gamma$ integrating servo in prior art trainers to provide a $\gamma$ output, the lift quantity, L, usually has been computed by means of the well-known relation:

$$L = \frac{\rho V^2 S C_L}{2} \quad (3)$$

wherein $$\frac{\rho V^2}{2}$$

or "$q$," equals instantaneous dynamic pressure, S equals representative wing area of the simulated aircraft, and $C_L$ equals instantaneous lift coefficient. The weight term $W \cos \gamma$ of Expression 1 usually has been computed by multiplying simulated aircraft weight W by cosine $\gamma$, often utilizing a $\gamma$ or flight path elevation angle velocity servo which integrates $\dot{\gamma}$ to position a cosine resolver.

Referring again to Fig. 1 and summing forces along the simulated flight path:

$$m\dot{V} = T \cos \alpha - D - W \sin \gamma \quad (4)$$

or $$\dot{V} = \frac{T \cos \alpha}{m} - \frac{D}{m} - \frac{W \sin \gamma}{m} \quad (5)$$

Prior art trainers commonly have computed simulated air-speed V by integrating with respect to time a rate of change of airspeed or $\dot{V}$ quantity computed in accordance with an expression such as Expression 5, which has also been written for simplicity of explanation to express forces in the vertical plane only of the simulated flight path. Such prior art trainers commonly have used a velocity or integrating servo to integrate $\dot{V}$ with respect to time to provide a computer quantity commensurate with airspeed, V. As is well known to those skilled in the art, the longitudinal motion of the aircraft in the plane shown in Fig. 1 may be expressed by a second order differential equation of the general form:

$$\ddot{x} + \frac{b\dot{x}}{a} + \frac{cx}{a} = 0$$

An equation having the general form may be written by solving Equations 1 and 4 simultaneously, to provide an equation having proportional and first and second derivatives of path elevation angle $\gamma$. As has been well known in the servo and analog computer arts, a servo system solving a second order differential equation must be provided at all times with damping signals (the $x$ signal in the above equation) if it is not to oscillate. If a servo system solving such an equation is provided with input signals which are derived electromechanically, the absence of a damping signal during occasions of supposed stability may occur due to the deficiencies inherently present in all contemporary servo systems.

When an aircraft flies at a steady or constant flight path elevation angle $\gamma$, i.e., when $\dot{\gamma}$ equals zero, Expression 1 may be written as follows:

$$0 = T \sin \gamma + L - W \cos \alpha$$

and potentials representing terms on the right-hand side of Expression 3 should add to zero to provide zero input to the servo.

If such potentials derived in prior art trainers were always in proper time phase they would add to zero with no special provision. However, the lift term $$\frac{\frac{1}{2} \rho V^2 S C_L}{mV}$$

of Equation 2 may be seen to be of a different power of airspeed V than either of the other terms. This inherent characteristic of the equation has made it necessary in all prior art trainers of which I am aware for either a multiplication or division by airspeed V to be provided in order to compute $\dot{\gamma}$, rate of change of flight path elevation angle. Such multiplication or division by airspeed in prior art trainers has usually been effected by means of potentiometers positioned by the airspeed servo. Regardless of the care and precision with which such servos have been constructed, time lag error have always been introduced into the simulator longitudinal stability system due to the inherent backlash, friction, and resolution limitations of servo multiplication or division, causing continuous oscillation of the path elevation angle servos of prior art trainers. Since the airspeed servo receives a $W \sin \gamma$ input potential which has been computed by modifying simulated weight W by a sine resolver driven by the oscillating $\gamma$ servo, the airspeed servos of such prior art trainers also tend to oscillate. Since several of the input potentials applied to the $\gamma$ servo are direct functions of airspeed, the bounded oscillation of the airspeed servo causes a further tendency of the $\gamma$ servo to oscillate, making it extremely difficult to stabilize such prior art longitudinal stability systems. A number of attempts have been made to eliminate or minimize such oscillations. One scheme which has been utilized somewhat in the past is the application of a "false" damping signal (false in that it has no counterpart in the dynamics of the actual aircraft) into the longitudinal stability system. Potentials which may be modified to provide such false damping signals are usually present at a number of places in electronic flight simulator systems, but unless such signals are applied only when the simulator longitudinal system should be stable, the normal phugoid oscillations of the simulator system will be improperly damped, providing unrealistic indications on the simulator rate of climb and gyro horizon indicators.

The use of all-electronic computation employing direct current carrier permits the accomplishment of substantially error-free integration. As is known to those skilled in the art, all-electronic integrators such as the well-known Miller integrator circuit, for example, sometimes offer tremendous advantages over electromechanical integrators such as velocity servos. Such electronic integrators are characterized by no discernible backlash, hysteresis or inertia. However, computation of aerodynamic lift L requires a multiplication of two variables, such as ($q$, dynamic pressure and $C_L$, coefficient of lift), both of which may be computed so as to exist as voltages at the output of electronic integrators, but since such voltages may not be multiplied conveniently, one by the other, it will be seen that mere substitution of electronic integrators for velocity servos will not provide a desirable combination. Although all-electronic analog computer multiplier apparatus which will multiply two voltage inputs is known, an example being the so-called "time division multiplier" circuit, such apparatus is undesirably complex and expensive, and of poor accuracy and reliability. If one of the two variables is used to position a servo and potentiometer to perform the multiplication, it will be seen that the errors characteristic of electromechanical integrators will return, since potentiometer servo multipliers are subject to the same inherent limitations mentioned above as characterizing electromechanical integrators. The invention avoids the use of an all-electronic multiplier and still effectively performs the required computations without the undesirable effects of electromechanical multiplication or integration.

Figure 4:
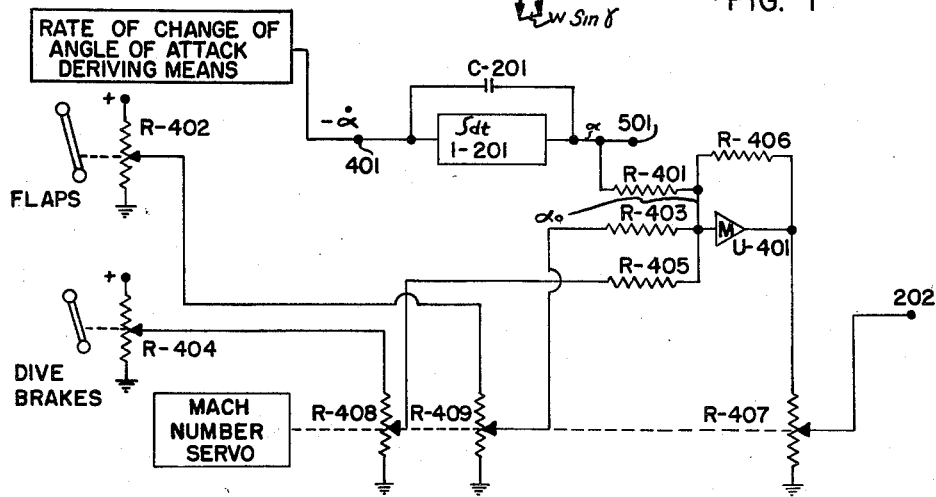
Fig. 4 is an electrical schematic diagram illustrating a novel manner in which a substantially noise-free potential commensurate with coefficient of lift of a simulated aircraft may be computed.

Referring to Fig. 2 there is shown in electrical schematic form portions of a modern simulator which should be considered in understanding the improved longitudinal stability system of the invention. A potential derived as will be explained below with reference to Fig. 4 and proportional to simulated life coefficient $C_L$ is applied at terminal 202 via scaling resistor R-200 to the input circuit of a conventional D.C. feedback amplifier having its output connected to excite potentiometer R-201, the arm of which may be positioned in accordance with simulated aircraft mass $m$ by a conventional simulator weight servo shown in block form. The potential on the arm of potentiometer R-201 is applied to the input circuit of amplifier U-201. It will be immediately apparent to those skilled in the art that such connection modifies the output of amplifier U-201 so as to provide a division by $m$. Assuming that scaling resistor R-200 is selected in accordance with the nominal or representative wing area S of the simulated aircraft, it will be seen that the output potential from amplifier U-201 will be commensurate with the quantity $S_{C_L/m}$. This quantity is applied to excite non-linear potentiometer R-204, the arm of which is positioned by the conventional trainer altitude servo, modifying the potential in accordance with simulated air density $\rho$, which is a non-linear function of simulated altitude. Potentiometer R-204 may comprise a non-linear potentiometer of conventional type having either a varying card width or a non-linear potential gradient obtained by means of padding resistors or fixed voltages supplied to taps on the potentiometer winding.

As will be understood more clearly as the description proceeds, system stability will depend largely upon the quality of two signals subtracted in computing flight path elevation angle. Since one of the two signals is directly proportional to lift coefficient $C_L$, it is desirable to provide a lift coefficient potential at terminal 202 which is relatively free of time-phase error or any "noise," i.e., errors due to potentiometer resolution, servo backlash, hysteresis errors, etc. Method and apparatus for providing such a lift coefficient quantity are shown and explained in connection with Fig. 4. It is to be understood, however, that the invention may utilize lift coefficient quantities computed in conventional electromechanical manner in lieu of the improved lift coefficient potentials derived by the apparatus of Fig. 4 with some sacrifice of stability.

The lift coefficient of aircraft flight is sometimes expressed as follows:

$$C_L = f_1(M)[\alpha + f_2(M)\delta_{WF} + f_3(M)\delta_{DB} \ldots]$$

wherein $f_1(M)$, $f_2(M)$ and $f_3(M)$ are each functions of Mach number of flight
$\delta_{WF}$ is wing flap deflection
$\delta_{DB}$ is dive brake deflection Potentials commensurate with wing flaps deflection and dive brakes deflection are derived by means of potentiometer R-402 and R-404, the wiper arms of which are positioned by the student's operation of the simulator wing flaps and dive brakes controls in conventional manner. As well as the wing flap and dive brake deflection terms including within the brackets of the above expression, other terms may be added to provide for a particular aircraft type simulator a coefficient of lift potential which will accurately reflect the effects of other changes in simulated aircraft aerodynamic configuration on simulated coefficient of lift. For example, the operation of a drag chute on an aircraft provided with such a device, or the lowering of landing gear each affect the coefficient of lift of an aircraft, and the effect of each of these phenomena may be simulated by providing potentiometers (not shown) similar to R-402 or R-404 operable to apply inputs to summing amplifier U-401 upon simulated operation of its respective control. Since the effect of each of these aerodynamic configuration changes on aircraft coefficient of lift is a function of instantaneous Mach number of flight, each of the abovementioned inputs applied to amplifier U-401 is multiplied by a function of Mach number by means of a shaped potentiometer (such as R-408 or R-409) having its arm positioned by the conventional grounded trainer Mach number servo shown in block form in Fig. 4. The combined effect of these aircraft configuration terms is sometimes designated $\alpha_0$, as they are usually specified in accordance with their magnitudes at zero angle of attack. As is readily apparent from the above expression, the coefficient of lift, $C_L$, depends upon the sum of these zero angle of attack terms and the effect on coefficient of lift of an angle of attack. In applying the invention to simulators which are intended to simulate slowly moving aircraft, it will be recognized by those skilled in the art that the Mach number potentiometers shown herein may be eliminated.

Applied to terminal 401 is a rate of change of angle of attack ($\dot{\alpha}$) potential, which is integrated with respect to time by electronic integrator I-201 to provide an output potential proportional to angle of attack $\alpha$ for application to amplifier U-401 via summing resistor R-401. Rate of change of aircraft angle of attack is sometimes expressed as follows:

$$\dot{\alpha} = q_1 + k\left[\frac{A_z}{V_p} + \frac{g \cos \phi}{V_p}\right]$$

wherein $q_1$ = aircraft pitching rate
$A_z$ = aircraft acceleration along its vertical axis
$g$ = force of gravity
$\phi$ = aircraft bank angle
$V_P$ = true airspeed
$k$ = scaling constant Those skilled in the art will recognize that each of the quantities included in the above expression is available as a shaft position or electrical voltage in almost all modern flight trainers, and that the expression can be mechanized in accordance with conventional analogue computer technique to provide an $\dot{\alpha}$ output potential. Furthermore, many contemporary flight trainers are provided with angle of attack servos, and in applying the invention to existing trainers it may be desirable to obtain the $\dot{\alpha}$ potential merely by means of a tachometer generator operated by a conventional prior art angle of attack servo. Since a specific form of computation of rate of change of angle of attack is not a part of this invention, a detailed description of the means for computing the $\dot{\alpha}$ quantity is not included herein. If desired, reference may be had to application Serial Number 477,741, filed December 27, 1954, by Laurence E. Fogarty for "Aircraft Trainer Apparatus," for suitable means for computing simulated angle of attack or the time-derivative thereof.

The angle-of-attack potential applied to amplifier U-401 via R-401 and the configuration effects potentials applied to amplifier U-401 are summed and then multiplied by a third function of Mach number by means of potentiometer R-407 to provide an output potential at terminal 202 proportional to simulated coefficient of lift, $C_L$. Since a "noise-free" potential output is provided by integrator I-201, and since the flaps and dive brakes potentiometers are not moved during expected steady-state flight conditions, it will be seen that the coefficient of lift potential derived at terminal 202 will be "noise-free" except for backlash errors, hysteresis and resolution errors introduced by the Mach number multiplying potentiometers R-407, R-408 and R-409.

Returning now to Fig. 2, it may be seen that, the $$\frac{-\rho S C_L}{m}$$

potential on the arm of potentiometer R-204 is applied via summing resistor R-205 to the input circuit of summing amplifier U-204, which has a conventional feedback resistor R-206. A potential commensurate with the quantity $$\left(\frac{\pm g \cos \phi \cos \gamma}{V^2}\right)$$

derived as will be explained below is applied to amplifier U-204 via summing resistor R-207, providing an output potential from the amplifier commensurate with the quantity:

$$\left[\frac{\rho S C_L}{m} - \frac{g \cos \phi \cos \gamma}{V^2}\right]$$

This output potential is applied to excite potentiometer R-208, the arm of which is positioned by the simulator airspeed servo M-201, providing an output potential commensurate with the quantity:

$$V\left[\frac{\rho S C_L}{m} - \frac{g \cos \phi \cos \gamma}{V^2}\right]$$

Rewriting Expression 1 with the small $T \sin \alpha$ term neglected for simplicity of explanation, and dividing both sides of that expression by $mV$:

$$\dot{\gamma} = \frac{L}{mV} - \frac{W \cos \gamma}{mV} \qquad (1a)$$

Substituting $$\frac{\rho V^2 S C_L}{2}$$

for L and m for $$\frac{W}{g}$$

it will be seen that Expression 1a may be written as:

$$\dot{\gamma} = V\left[+\frac{S C_L}{2m} - \frac{\cos \phi \cos \gamma}{V^2}\right]$$

which may be seen to correspond with the output potential derived on the arm of potentiometer R-208 as explained above. This potential is applied via scaling resistor R-209 to an electronic integrator I-203, which integrates the $\dot{\gamma}$ potential with respect to time, providing a $\gamma$ output potential at terminal 204 commensurate with instantaneous simulated flight path elevation angle $\gamma$. The $\gamma$ potential is applied as shown via resistor R-210 to the input circuit of the trainer flight path elevation angle servo M-200, a conventional position servo, having a follow-up potentiometer R-211 operated by the output shaft of the servo, so as to apply a servo re-balancing signal to the servo input circuit via summing resistor R-212. Servo M-200 positions the arms of a plurality of other potentiometers, only one (R-213) of which is shown, to positions commensurate with the angle $\gamma$. It might be well to repeat at this point that the above theory is confined to the vertical plane and assumes no bank angle, and that portions of the prior art relating solely to effects arising due to banking are not shown herein. As is known to those skilled in the art, the angle simulated by the potential denominated $\dot{\gamma}$ herein is perhaps more commonly designated as $q_w$, the pitching rate about the airplane lateral wing axis. Actual path elevation angle rate also includes a component due to $r_w$, yawing rate, if the airplane is banked. Since bank angle has been assumed to be zero, as mentioned above, $q_w$ corresponds to $\dot{\gamma}$. A potential proportional to $-\dot{V}$, acceleration of the simulated aircraft along the flight path is derived by conventional simulator circuitry (not shown) which solves Equation 4. This potential is applied via terminal 201 to electronic integrator I-204, thereby deriving an output potential $+V$, which is applied via summing resistor R-231 to the trainer airspeed servo M-201, a conventional position servo having a follow-up potentiometer R-229 operated by the servo output shaft and operable to apply a rebalancing potential to the servo input circuit via summing resistor R-228. As indicated schematically, airspeed servo M-201 positions the arm of potentiometer R-208 to perform the multiplication required in the $\dot{\gamma}$ computation explained above, and the servo also positions the arms of further potentiometers (not shown) for providing the effect of airspeed V in other circuits of the simulator.

The airspeed potential output from integrator I-204 is also applied via resistor R-214 to a diode function generator shown as comprising feedback amplifier U-203, conventional vacuum diodes V-1 through V-4 and resistors R-216 through R-224. The purpose of the electronic non-linear function generator is to receive an input potential proportional to simulated velocity V via resistor R-214 and to produce as an output the non-linear function $$\frac{1}{V^2}$$

Figure 3:
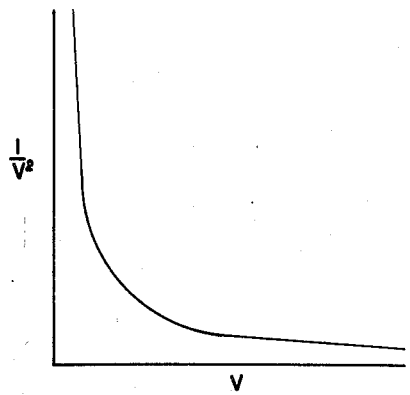
Fig. 3 is a graphical illustration of the operation of non-linear circuit portion of the invention shown in Fig. 2 as comprising a diode function generator.

This non-linear function is shown plotted in Fig. 3, and the diode function generator provides an output potential closely approximating the function. The function generator is shown as comprising four diodes, but greater or lesser numbers of diodes may be used to obtain greater or lesser accuracy of function generation. Diodes V-1 through V-4 are each shown having their cathodes connected through different scaling resistors (R-220 through R-223) to a positive power supply potential 203. As will be apparent to those skilled in the art, the value of input potential at which each diode will begin to conduct may be determined by the values of the pair of voltage divider resistors to which the cathode of the particular diode is connected. As the positive input potential proportional to simulated airspeed V increases, it will be seen that the cathodes of the diodes will be made increasingly negative, and at various input voltage values different diodes will begin to conduct, causing the output potential on conductor 210 to go negative in a non-linear fashion.

The $$\frac{1}{V^2}$$

output potential is applied to excite the winding of cosine resolver R-213, the arm of which is positioned by $\gamma$ servo M-200, deriving a $$\frac{-g \cos \gamma}{V^2}$$

potential which is further multiplied by $\cos \phi$ by resolver R-225, the arm of which is positioned by the conventional simulator bank angle servo shown in block form. The output potential from resolver R-225 is applied via a polarity-inverting feedback amplifier to summing amplifier U-204 for use in computing $\dot{\gamma}$ as explained above. Thus it will be seen that path elevation angle servo M-200 and airspeed servo M-201 are interconnected and supplied with the correct potentials to provide output quantities commensurate with simulated path elevation angle and simulated airspeed.

It will be seen that in providing the input potentials for $\gamma$ servo M-200 that electromechanical multiplications have been made by potentiometers R-211, R-208, R-204, R-201, R-225, and R-213. At first glance it would appear that the use of electromechanical multipliers to perform the operations shown would re-insert all of the electromechanical errors and limitations intended to be eliminated by use of all-electronic integration. However, V multiplier potentiometer R-208 may have finite resolution and a reasonable amount of backlash, since errors in the multiplication because of such limitations merely cause errors in the magnitude of the computed value of $\dot{\gamma}$, but do not prevent $\dot{\gamma}$ from approaching or remaining zero under proper operation of the simulator controls. Aircraft pitch angle is the sum of aircraft path elevation angle and angle of attack in the vertical plane, and a pilot generally notices changes in aircraft path elevation angle by the effect such changes make in rate of climb and pitch angle, as indicated by the rate-of-climb indicator and the pitch bar of a gyrohorizon or other attitude indicating instrument. Prior art simulators provided an oscillating $\gamma$ quantity so that the rate-of-climb needle and the pitch bar operating quantity $\theta$ computed using $\gamma$ caused the climb needle and pitch bar to oscillate continuously, even though their counterparts in an actual aircraft do not. It will be seen from Expression 1a that even though the V multiplication of the bracketed quantity is performed with the usual electromechanical errors, that if the two terms within the brackets are substantially free from time-phase errors due to electromechanical limitations, and hence able to become substantially equal and opposite, that the answer $\gamma$ may be computed with much greater accuracy. Further, it will be seen that in analog computing apparatus wherein all multiplication operations are performed with percentage and possible time-phase errors, and subtraction may be done with extreme precision, that less error results from subtracting two small multiplications and then multiplying the difference by a multiplier than from first multiplying each multiplicand by the multiplier and then subtracting one large product from another. For this reason also, the term computed in accordance with the invention may be seen to be more accurate, as well as the fact that it is capable of approaching zero with much greater precision and stability than in prior art systems. The use of the other electromechanical multipliers shown is relatively harmless for similar reasons. At simulated level and steady-state flight conditions, which are the chief conditions under which the simulator climb needle and pitch bar should be expected to remain absolutely still, cosine $\gamma$ is approximately unity, and as is well known, the value of the cosine function changes very slowly at low values of an angle. Hence resolver R-213 will be operating on the most favorable portion of its winding as far as its resolution is concerned, and since the value of cos $\gamma$ changes very slowly at such angles, the ordinary electromechanical limitations of servo M-200 and resolver R-213 do not harm materially the quality of the computed potential. Similarly, although to a lesser extent, bank angle $\phi$ is usually expected to be small or zero at times when the simulator pitch bar should remain still, so that resolver R-225 will be operating on the most favorable portion of its winding and the value of cos $\phi$ will change only very slightly, allowing the use of electromechanical multiplication at that portion of the invention. Furthermore, the bank angle servo input potentials are not as dependent upon airspeed or path elevation angle as the latter two quantities are on each other, so that small errors caused by the bank angle servo and resolver R-225 do not cause the bank angle servo and path elevation angle servo to form an oscillating servo loop.

Although $\rho$ (air density) is dependent upon aircraft altitude, which, in turn, is dependent upon path elevation angle and airspeed, the rate of variation in $\rho$ is so slow compared to the possible variations in the other terms that the use of potentiometer R-204 has an undetectable effect upon performance of the invention. Similarly, the change in weight of the simulated aircraft, such as by fuel depletion, is so slow that use of potentiometer R-201 does not appreciably affect the quantity of the signal applied to amplifier U-201. The provision of means whereby the two major quantities which determine rate of change of path elevation angle may be generated in substantially noise-free form and then subtracted before being multiplied by a function of airspeed allows computation of a path elevation angle which does not continuously oscillate due to the inherent limitations of electromechanical servo apparatus.

Since pitch angle $\theta$ may be expressed as the sum of path elevation angle $\gamma$ and angle of attack $\alpha$, potentials derived from the output circuit of electronic integrator I-201 (see Fig. 4) and integrator I-203 (see Fig. 2) may be routed to a summing amplifier to provide an output potential commensurate with simulated pitch angle for operation of the simulator gyro horizon.

As mentioned above, aircraft pitch angle $\theta$, the angle between the aircraft longitudinal axis and the horizontal, is the sum of path elevation angle $\gamma$, the angle between a tangent to the aircraft flight path and the horizontal and angle of attack $\alpha$, the angle between the aircraft longitudinal axis and the flight path, continuing to assume, of course, that there is no bank angle. Most modern flight simulators compute two of the three angles from other input quantities and then compute the third angle by vectorially adding or subtracting the two computed angles. For example, the apparatus shown above computes $\alpha$ and $\gamma$, and a summing means is used to provide a $\theta$ output quantity for positioning the horizontal needle of the simulator gyro horizon. In Fig. 5, the angle of attack $\alpha$ potential from terminal 501 of Fig. 4 and the path elevation angle $\gamma$ potential from terminal 204 of Fig. 2 are applied to summing amplifier U-504 (having feedback resistor R-505) via summing resistors R-502 and R-503, respectively, to provide a pitch angle $\theta$ potential, which latter potential is applied to position a conventional simulator gyro horizon. As mentioned above, bank angle has been assumed to be zero for simplicity of explanation. Those skilled in the art will readily recognize that the invention may be applied with minor modifications to a system which computes $\alpha$ and $\theta$ and subtracts them to produce a $\gamma$ output quantity.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Grounded aircraft training apparatus comprising means for deriving a first potential commensurate with the ratio between instantaneous simulated coefficient of lift and instantaneous simulated aircraft mass, second means including a resolver for deriving a second potential commensurate with the ratio between the cosine of simulated path elevation angle and the square of simulated airspeed, summing means responsive to said first and second potentials to provide a third potential, third means for modifying said third potential in accordance with simulated airspeed to provide a fourth potential, integrating means responsive to said fourth potential to provide an output quantity commensurate with simulated path elevation angle, and a servomechanism connected to receive said output quantity, said servomechanism being mechanically connected to adjust said resolver.

2. Apparatus according to claim 1 in which said means for deriving said first potential comprises means for deriving a further potential commensurate with simulated rate of change of angle of attack, an electronic integrator responsive to said further potential to provide an output potential, means for deriving configuration effects potentials commensurate with the effects of aircraft configuration on aircraft coefficient of lift, summing means responsive to said further potential and said configuration effects potentials to provide a fifth potential commensurate with simulated coefficient of lift, and means for modifying said fifth potential in accordance with simulated aircraft weight and altitude to provide said first potential.

3. Apparatus according to claim 1 in which said means for deriving said second potential comprises means for deriving a fifth potential commensurate with simulated airspeed, nonlinear circuit means responsive to said fifth potential for deriving a further potential commensurate with the reciprocal of the square of simulated airspeed, and means for modifying said further potential in accordance with simulated path elevation angle to provide said second potential.

4. Grounded aircraft training apparatus comprising electronic means for deriving a first potential commensurate with simulated coefficient of lift, means for modifying said first potential in accordance with simulated aircraft weight to provide a second potential, means for deriving a third potential commensurate with simulated rate of change of airspeed, electronic integrating means responsive to said third potential to provide a fourth potential commensurate with simulated airspeed, non-linear circuit means responsive to said fourth potential to provide a fifth potential commensurate with the reciprocal of airspeed squared, means for modifying said fifth potential in accordance with simulated path elevation angle to provide a sixth potential, amplifier means responsive to said second and sixth potentials to provide a further potential, a position servomechanism responsive to said fourth potential to provide a shaft position output quantity commensurate with simulated airspeed, a potentiometer having its winding connected to be excited by said further potential and its wiper arm positioned by said shaft position output quantity, and an integrating means connected to said wiper arm to provide a computer output quantity commensurate with simulated path elevation angle, said means for modifying said fifth potential being responsive to said integrating means.

5. Grounded aircraft training apparatus comprising means for deriving a first potential commensurate with rate of change of simulated airspeed, an electronic integrator responsive to said first potential for providing a second potential commensurate with simulated airspeed, a first feedback amplifier responsive to said second potential, a plurality of diodes connected through a plurality of resistors between the input and output circuits of said feedback amplifier to provide non-linear operation of said feedback amplifier, a servomechanism and a cosine resolver actuated by said servomechanism, means for deriving a third potential commensurate with the ratio between simulated coefficient of lift and simulated aircraft mass, a second feedback amplifier, circuit means connecting the output circuit of said first feedback amplifier to said resolver, means connecting said resolver and said third potential to said second feedback amplifier, means connected to modify the output potential of said second feedback amplifier in accordance with simulated airspeed, electronic integrating means responsive to the modified output potential to provide a further output potential commensurate with simulated path elevation angle, said further output potential being connected to actuate said servomechanism.

References Cited in the file of this patent

UNITED STATES PATENTS

| | | |
|---|---|---|
| 2,554,155 | Rippere | May 22, 1951 |
| 2,595,185 | Zanderer et al. | Apr. 29, 1952 |
| 2,714,309 | Redemske | Aug. 2, 1955 |
| 2,804,264 | Stern | Aug. 27, 1957 |
| 2,858,623 | Stern et al. | Nov. 4, 1958 |

OTHER REFERENCES

Proceeding of the IRE (Ragazzini et al.), May 1947, pages 449–450.

Proceedings of the National Electronics Conference (Meneley et al.), vol. 5, 1950, pages 62 and 63.

AIEE Transactions (Hall), vol. 69, part I, pages 308–320.

Symposium I on REAC Techniques, by Reeves Instrument Corp. (under Project Cyclone for Navy); March 16, 1951, New York City, page 122.

Electrical Engineering (Wood), December 1952, pages 1124–1129.

Electronic Engineering (Baxter), March 1954, pages 97–99.

Electronic Analog Computers (Korn and Korn), page 281, 1952.

Some Electronic Analogue Computer Techniques (Robb et al.), January 1953, pages 5–7.

UNITED STATES PATENT OFFICE
CERTIFICATE OF CORRECTION

Patent No. 2,935,796            May 10, 1960

John M. Hunt

It is hereby certified that error appears in the printed specification of the above numbered patent requiring correction and that the said Letters Patent should read as corrected below.

Column 3, line 47, for "x" read -- $\dot{x}$ --; column 9, line 11, between "the" and "term" insert -- $\dot{\gamma}$ --.

Signed and sealed this 27th day of December 1960.

(SEAL)
Attest:
KARL H. AXLINE

Attesting Officer

ROBERT C. WATSON
Commissioner of Patents